Figure 1:
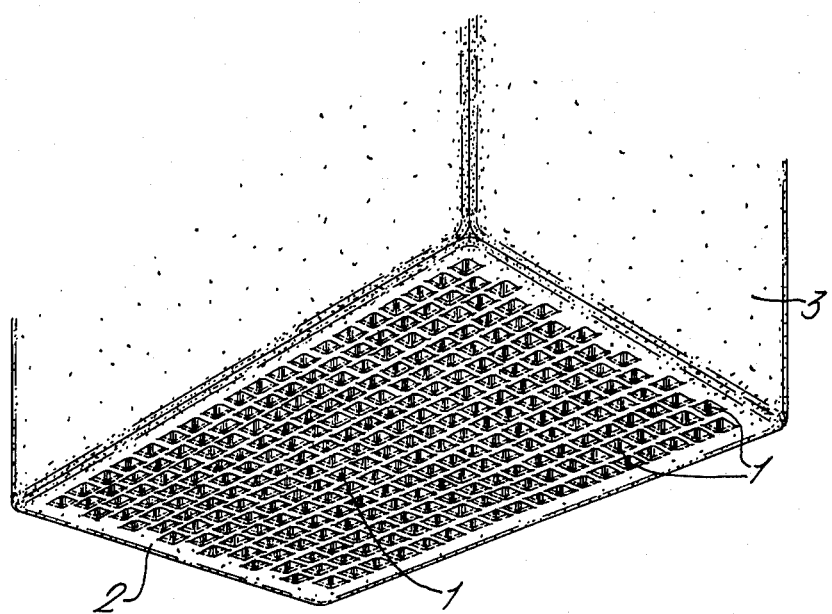

United States Patent [19]
Roberts et al.

[11] 3,974,300
[45] Aug. 10, 1976

[54] ICE CONFECTION

[75] Inventors: Clive Arnold Roberts, Oakley; Jennifer Joan Scott nee Reid, Wellingborough; Michael John Willis, Bedford, all of England

[73] Assignee: Thomas J. Lipton, Inc., Englewood Cliffs, N.J.

[22] Filed: Feb. 27, 1975

[21] Appl. No.: 553,748

[30] Foreign Application Priority Data
Mar. 1, 1974 United Kingdom............... 9396/74

[52] U.S. Cl................................. 426/565; 426/101
[51] Int. Cl.²......................................... A23G 9/00
[58] Field of Search............ 426/100, 101, 514–517, 426/143, 565–567, 660, 524; D1/2, 3, 10, 11, 21–23

[56] References Cited
UNITED STATES PATENTS

| | | | |
|---|---|---|---|
| 1,107,325 | 8/1914 | Laskey............................... | 426/514 |
| 1,429,405 | 9/1922 | Carter et al........................ | 426/514 |
| 1,797,417 | 3/1931 | Hatcher............................. | 426/514 |

Primary Examiner—A. Louis Monacell
Assistant Examiner—R. B. Penland
Attorney, Agent, or Firm—Brumbaugh, Graves, Donohue & Raymond

[57] ABSTRACT

Novel ice confections are described that contain air passages. The passages are preferably parallel to each other and are so arranged that cutting of the ice confection at low temperatures, eg deep-freeze temperatures is facilitated and is adequately uniform throughout the ice confection.

4 Claims, 1 Drawing Figure

ICE CONFECTION

The invention relates to an ice confection, particularly to ice cream.

As is generally known there is and has been since ice confections have been a commercial product, great pressure to produce novelty products; such products have immediate appeal to the consumer and can greatly increase sales. The invention provides such a novelty product in the form of an ice confection containing air passages. The passages will preferably, but not necessarily, run right through the confection, i.e. will be open.

Such a product has a number of advantages. First, it has an aesthetic appeal at least when cut into. Secondly, it is more readily cut into at deep-freeze temperature than a block of comparable confection. Thirdly, it is cheaper than a solid block whilst not deceiving the consumer, since the air passages will be visible on consumption of the product. The second advantage should perhaps be explained further: one major problem with a typical way of handling ice confections in the home is that shortly before a meal ice cream is taken from the deep freeze and found to be very difficult to cut. This could notionally be avoided by formulating such that the ice confection is, at deep-freeze temperature, not too hard but then at room temperature the product would normally be too mushy. The product according to the invention has the advantage of improved ease of cutting without the disadvantage of being too mushy at room temperature.

It will be appreciated that ice cream and many other ice confections conventionally contain air or other gas in the form of overrun. Such overrun is normally and is always intended to be distributed as very fine bubbles but sometimes larger bubbles form. These can hardly be described as air passages as in the product according to the invention. Overrun is defined as the percentage increase in volume of the aerated product at normal pressure compared with the volume of the unaerated mix before aeration.

For ease of preparation the air passages in the product according to the invention are preferably parallel to each other. A product according to the invention can be made for instance by moulding or more conveniently by extrusion, preferably by a process according to the invention set out in our co-pending application Ser. No. 553,749 of like date, corresponding to UK patent application 9395/74. When the ice confection is extruded, the air passages will be parallel to the direction of extrusion. As already explained, an advantage of an ice confection containing longitudinal air passages is that it can more readily be broken, for instance with a spoon, than the same ice confection not containing an air passage. Thereby the ice confection containing air passages can be eaten more readily straight from a deep-freeze (−18°C normally) than can the corresponding conventional product. To achieve this advantage the walls between nearest neighbour air passages are preferably less than 5 cms thick, particularly preferably less than 1 cm thick. An additional advantage when the passages are open is warm-eating due to readier warming-up of the ice confection with open passages. To give improved structural stability the distance between the outer air passages and the parallel exterior of the ice confection can conveniently be greater than the thickness of the walls between air passages but the distance should preferably be less than 5 cms. To obtain preferred levels of structural stability both this distance and the thickness of the walls should preferably be at least 0.1 cm. To achieve adequate uniformity of cut (eg adequate uniformity of resistance to a spoon) the wall thickness between each passage and its nearest neighbour is preferably the same. For good structure and particularly for good extrusion the ice confection should have an overrun greater than 20%, particularly greater than 60%. For ice cream conventionally the overrun is less than 300%. Overruns outside these ranges can be made.

A particularly preferred aspect of the invention depends on the appreciation that a composite confection can be prepared by filling the air passages with an edible material. For instance a liquid, for example a sauce or a liqueur, can be poured onto a product according to the invention in which the air passages are open to give a particularly attractive novelty product. Similarly, the passages can be filled with a solid or semi-solid edible product, such as chocolate, honey or an ice confection of different texture, colour or flavour. Such products form particular aspects of the present invention.

The invention will further be illustrated by the following example.

FIG. 1 illustrates a bar according to the invention. Air passages 1 are surrounded by a support-region 2 and are parallel to sides 3.

An ice cream of the structure shown in FIG. 1 was prepared as follows using a freezer of the type shown in FIG. 1 of our copending application corresponding to UK 9396/74. In this freezer a freezer unit of any conventional type, in particular one containing a beater, is connected by means of a feed-pipe to an extrusion head. In the extrusion head a gradually tapering portion is connected to a wide extrusion portion of uniform cross-section terminating in the extrusion end 5 of the extrusion head. A plate containing a multiplicity of holes is across the extrusion end. The extrusion head is conventional except for the plate. The extrusion end conventionally will be rectangular in cross-section but more conveniently, since it avoids the difficulty of tapering from the circular pipe to a rectangular cross-section, is circular, using a British Standard 16 mesh patterned to give an array containing regularly spaced blocked-off areas.

The formulation of ice cream mix was:

| | % by weight |
|---|---|
| Spray-dried skim milk powder | 9.5 |
| Sucrose | 15 |
| Maltodextrin 40 DE (dextrose equivalent) | 2.0 |
| Palm oil | 9.5 |
| Monoglycerides (emulsifier) | 0.5 |
| Locust Bean Gum | 0.175 |
| Salt | 0.05 |
| Flavour and Colour | 0.1 |
| Water to 100% | |

The solid ingredients were mixed with water and heated to 65°C. The palm oil and emulsifier were then added and the total mix still at 65°C was homogenised, a conventional two-stage homogenisation, and then pasteurised by being heated at 85°C for 15 secs. The mixture was then cooled to 4°C in a plate heat exchanger and aged for 2 hours with gentle agitation. The aged mix was frozen to −5°C and aerated to 110% overrun in a conventional freezer unit (Crepaco Freezer type KRIM 18 - 3163) containing a beater. The frozen mix was then extruded. The flow rate was 2 kg/ minute. The extrusion temperature was between −3.7°C and −4.2°C. The pressure drop across the mesh was slightly less than ⅓ atmosphere. The extruded log was cut into bars at the extrusion face by a wire drawn across the face of the mesh. The bars obtained were hardened by storage in a room with an air temperature of − 30°C.

What is claimed is:

1. An extruded novelty ice cream product containing longitudinal parallel air passages, the distance between nearest neighbour air passages being less than 5 centimeters and not less than 0.1 centimeter.

2. The product as claimed in claim 1 in which the distance between each passage and its nearest neighbour is the same.

3. The product as claimed in claim 1 in which the air passages run through the entire product.

4. The product as claimed in claim 1 in which the product has an overrun in the range 20% to 300%.

* * * * *